(12) United States Patent
Boyer

(10) Patent No.: US 10,769,537 B2
(45) Date of Patent: Sep. 8, 2020

(54) COGNITIVE QUESTION ANSWERING PIPELINE BLENDING

(71) Applicant: International Business Machines Corporation, Armonk, NY (US)

(72) Inventor: John M. Boyer, Victoria (CA)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 15/188,066

(22) Filed: Jun. 21, 2016

(65) Prior Publication Data

US 2017/0364806 A1    Dec. 21, 2017

(51) Int. Cl.
  *G06N 5/02*      (2006.01)
  *G06F 16/332*    (2019.01)
  *G06N 20/00*     (2019.01)

(52) U.S. Cl.
  CPC ......... *G06N 5/022* (2013.01); *G06F 16/3329* (2019.01); *G06N 20/00* (2019.01)

(58) Field of Classification Search
  CPC ........ G06N 5/022; G06N 20/00; G06N 7/005; G06F 16/3329
  See application file for complete search history.

(56) References Cited

U.S. PATENT DOCUMENTS

| | | | |
|---|---|---|---|
| 8,966,578 B1 | 2/2015 | Belov et al. | |
| 8,996,555 B2 | 3/2015 | Kuchmann-Beauger et al. | |
| 9,020,862 B2 | 4/2015 | Ni et al. | |
| 9,754,215 B2 | 9/2017 | Clark et al. | |
| 9,940,367 B1 | 4/2018 | Baker et al. | |
| 10,445,317 B2 | 10/2019 | Sanchez et al. | |
| 2009/0287678 A1 | 11/2009 | Brown et al. | |
| 2009/0292687 A1 | 11/2009 | Fan et al. | |
| 2011/0125734 A1 | 5/2011 | Duboue et al. | |
| 2012/0078890 A1 | 3/2012 | Fan et al. | |
| 2012/0191716 A1 | 7/2012 | Omoigui | |
| 2013/0029307 A1 | 1/2013 | Ni et al. | |

(Continued)

OTHER PUBLICATIONS

Anonymous, "Method and System for Automatic Metadata Extraction and Question Answering in a File Sharing Application", ip.com, An IP.com Prior Art Database Technical Disclosure, IP.com Electronic Publication Date: Dec. 21, 2010, IP.com No. IPCOM000202537D, 3 pages.

(Continued)

*Primary Examiner* — Robert A Cassity
*Assistant Examiner* — Brent Johnston Hoover
(74) *Attorney, Agent, or Firm* — Scott S. Dobson

(57) ABSTRACT

An answer to a question may selected from answers from a set of answering pipelines. Question answer data can be generated for a question, using a first answering pipeline. Another set of question answer data can be generated for the second question, using the second answering pipeline. The question answer data can include answers and confidence values for each answer. Using a weighting formula and a blending profile for the first answering pipeline, a vote weight can be determined for an answer with the highest confidence value. The same weighting formula and a second blending profile may be used to determine a vote weight for another answer with the highest confidence value. An answer to the question may be selected from the answers, based on the overall highest vote weight.

14 Claims, 10 Drawing Sheets

(56) References Cited

U.S. PATENT DOCUMENTS

| | | | |
|---|---|---|---|
| 2013/0262501 | A1 | 10/2013 | Kuchmann-Beauger et al. |
| 2014/0141399 | A1 | 5/2014 | Agarwal et al. |
| 2014/0172883 | A1 | 6/2014 | Clark et al. |
| 2014/0280087 | A1 | 9/2014 | Isensee et al. |
| 2014/0280307 | A1 | 9/2014 | Gupta et al. |
| 2014/0343984 | A1 | 11/2014 | Shahabi et al. |
| 2014/0358890 | A1 | 12/2014 | Chen et al. |
| 2014/0358922 | A1 | 12/2014 | Alkov et al. |
| 2015/0026163 | A1 | 1/2015 | Haggar et al. |
| 2015/0161230 | A1* | 6/2015 | Alkov .................. G06F 16/35 707/737 |

OTHER PUBLICATIONS

Anonymous, "System and method to improve accuracy, confidence, evidence, relevant and expected answers based on the context of the question asker", ip.com, An IP.com Prior Art Database Technical Disclosure, IP.com Electronic Publication Date: Sep. 3, 2014, IP.com No. IPCOM000238560D, 3 pages.

Anonymous, "System and Method for directing a question to the appropriate question and answering pipeline to seamlessly support multiple pipelines in a single cluster", ip.com, An IP.com Prior Art Database Technical Disclosure, IP.com Electronic Publication Date: Nov. 28, 2012, IP.com No. IPCOM000223768D, 3 pages.

Mell et al., "The NIST Definition of Cloud Computing", Recommendations of the National Institute of Standards and Technology, NIST, U.S. Department of Commerce, Special Publication 800-145, Sep. 2011, 7 pages.

Boyer, J., "Cognitive Question Answering Pipeline Calibrating", U.S. Appl. No. 15/188,051, filed Jun. 21, 2016.

List of IBM Patents or Patent Applications Treated as Related, dated Jun. 20, 2016, pp. 1-2.

List of IBM Patents or Patent Applications Treated as Related, dated Sep. 17, 2019, pp: 1-2.

Boyer et al., "Cognitive Question Answering Pipeline Blending", U.S. Appl. No. 16/574,193, filed Sep. 18, 2019.

List of IBM Patents or Patent Applications Treated as Related, dated Oct. 29, 2019, 2 pages.

Boyer et al., "Cognitive Question Answering Pipeline Calibrating", U.S. Appl. No. 16/683,310, filed Nov. 14, 2019.

Baughman et al., "DeepQA Jeopardy! Gamification: a Machine-Learning Perspective" Oct. 17, 2013, IEEE Transactions on Computational Intelligence and AI in Games, vol. 6, No. 1, pp. 55-66. (Year: 2013).

Waltinger et al., "Natural Language Access to Enterprise Data" 2014, AI Magazine, pp. 38-52. (Year: 2014).

Waltinger et al., "USI Answers: Natural Language Question Answering Over (Semi-) Structured Industry Data", 2013, Proceedings of the Twenty-Fifth Innovative Applications of Artificial Intelligence Conference, pp. 1471-1478. (Year: 2013).

Epstein et al., "Making Watson Fast" 2012, IBM J. Res. & Dev., vol. 56, No. 3/4, 15:1-12. (Year: 2012).

Zadronzny et al., "Explaining Watson: Polymath Style", 2015, Proceedings of the Twenty-Ninth AAAI Conference on Artificial Intelligence, pp. 4078-4082 (Year: 2015).

Lapshin, V.A., "Question-Answering Systems: Development and Prospects", 2012, Automatic Documentation and Mathematical Linguistics, vol. 47, No. 3, pp. 138-145 (Year 2012).

Kalyanpur et al., "Structured data and inference in DeepQA", 2012, IBM J. Res. & Dev., vol. 56, No. 3/4, 10:1-14 (Year:2012).

Goel et al., "Using Watson for Constructing Cognitive Assistants", Jun. 2016, Advances in Cognitive Systems 4, pp. 1-16 (Year:2016).

De Sa et al., "DeepDive: Declarative Knowledge Base Construction", Mar. 2016, SIGMOD Record, vol. 45, No. 1, pp. 60-67 (Year: 2016).

Gliozzo et al., "Semantic Technologies in IBM Watson", 2013, Proceedings of the Fourth Workshop on Teaching Natural Language Processing, pp. 85-92 (Year 2013).

* cited by examiner

COGNITIVE QUESTION ANSWERING PIPELINE BLENDING

BACKGROUND

The present relates to computer systems, and more specifically, to question answering (QA) systems.

Recent research has been directed to developing question answering (QA) systems designed to receive input questions, analyze them, and return applicable answers. These systems may rely on natural language processing, automated reasoning, machine learning, and other advanced techniques. Using these techniques, QA systems may provide mechanisms for searching large sources of content and analyzing the content with regard to a given input question in order to determine an answer to the question. In some QA systems this may take the form of hypothesis generation, scoring, and ranking in order to determine a final set of one or more output answers. An example of a QA system is IBM's WATSON system.

SUMMARY

Embodiments of the present disclosure may be directed toward a method that begins when a first set of question answer data is generated. The data may be generated using a first answering pipeline, and the question answer data may include a first set of answers and a set of first pipeline confidence values for each answer. A second set of question answer data for the question may be generated using a second answering pipeline. The second set of question answer data may include a second set of answers and a set of second pipeline confidence values for each answer in the second set of answers. Using a weighting formula and a first blending profile, a first vote weight for an answer in the first set of question answer data that was assigned a first pipeline highest confidence value by the first answering pipeline. Using the same weighting formula and a second blending profile, a second vote weight for an answer in the second set of question answer data that was assigned a second pipeline highest confidence value by the second answer pipeline may be determined. The first and second blending profiles may be associated with the first and second answering pipelines, respectively. The answer with an overall highest vote weight may then be selected from among the answers in the first set of question answer data and in the second set of question answer data. The answer selected may be selected as the first answer to the question.

Embodiments of the present disclosure may be directed toward a computer readable storage medium with program instructions stored thereon, and one or more processors configured to execute the program instructions to perform a method. The method may begin when a first set of question answer data is generated. The data may be generated using a first answering pipeline, and the question answer data may include a first set of answers and a set of first pipeline confidence values for each answer. A second set of question answer data for the question may be generated using a second answering pipeline. The second set of question answer data may include a second set of answers and a set of second pipeline confidence values for each answer in the second set of answers. Using a weighting formula and a first blending profile, a first vote weight for an answer in the first set of question answer data that was assigned a first pipeline highest confidence value by the first answering pipeline. Using the same weighting formula and a second blending profile, a second vote weight for an answer in the second set of question answer data that was assigned a second pipeline highest confidence value by the second answer pipeline may be determined. The first and second blending profiles may be associated with the first and second answering pipelines, respectively. The answer with an overall highest vote weight may then be selected from among the answers in the first set of question answer data and in the second set of question answer data. The answer selected may be selected as the first answer to the question.

Embodiments of the present disclosure may be directed toward a computer program product with a computer readable storage medium, where the computer readable storage medium may have program instructions embodied therewith, and it is not a transitory signal per se. The program instructions may be executed by a computer processing circuit to cause the circuit to perform a method. The method may begin when a first set of question answer data is generated. The data may be generated using a first answering pipeline, and the question answer data may include a first set of answers and a set of first pipeline confidence values for each answer. A second set of question answer data for the question may be generated using a second answering pipeline. The second set of question answer data may include a second set of answers and a set of second pipeline confidence values for each answer in the second set of answers. Using a weighting formula and a first blending profile, a first vote weight for an answer in the first set of question answer data that was assigned a first pipeline highest confidence value by the first answering pipeline. Using the same weighting formula and a second blending profile, a second vote weight for an answer in the second set of question answer data that was assigned a second pipeline highest confidence value by the second answer pipeline may be determined. The first and second blending profiles may be associated with the first and second answering pipelines, respectively. The answer with an overall highest vote weight may then be selected from among the answers in the first set of question answer data and in the second set of question answer data. The answer selected may be selected as the first answer to the question.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
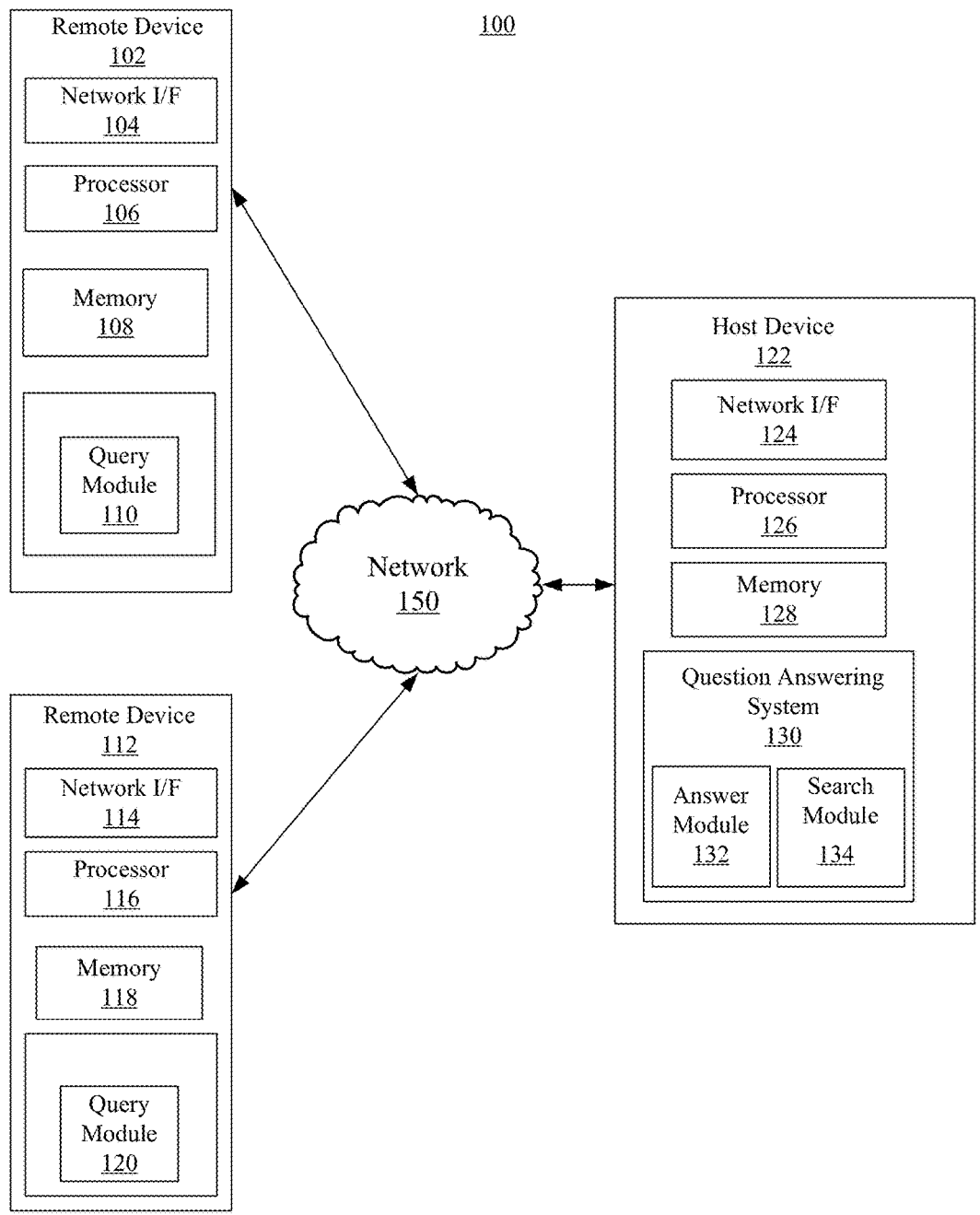
FIG. 1 depicts a block diagram of an example computing environment for use with a question answering system, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer systems, more particular aspects relate to question answering (QA) systems. While the present disclosure is not necessarily limited to such applications, various aspects of the disclosure may be appreciated through a discussion of various examples using this context.

In cognitive computing, a monolithic question and answer (QA) system containing multiple answering pipelines may be decomposed into separate cognitive services. For example, answering pipelines for different types of questions may be created as separate cognitive services, in order to facilitate reuse in different combinations within different cognitive solutions. Additionally, answering pipelines for the same type of questions may be created by separate development teams and operate over separate data sources. The combination of the pipeline capabilities may exceed the capabilities of each individual pipeline. In some cases, a cognitive solution developer may be expected to utilize a set of answering pipeline cognitive services in order to develop a situation-specific solution (e.g., for a particular client).

In some instances, a cognitive solution developer may use a question classifier service. A question classifier service may be a system trained to distinguish questions of various types. For example, a QA system may be trained to answer both questions that require a factoid answer (e.g., "What color is the sky?") as well as questions that require a descriptive passage answer (e.g., "Why is the sky blue?"). In using a question classifier, the QA system may first filter incoming questions through the question classifier, and, based on a resultant classification, invoke the appropriate answering pipeline cognitive service.

At times, the question classifier may not be able to achieve the desired accuracy in distinguishing the intent of the question, due to, for example, linguistic ambiguity or the brevity of a question. Thus, in many cases, the question classifier is unable to return a specific class for the question type, but rather it may return a list of likely classes, with confidence values attached to each class. The confidence values may indicate the particular confidence of the question classifier that the question is of the indicated class. In some cases, the cognitive solution developer may simply choose to invoke an answering pipeline associated with the highest confidence question class, but this may be less accurate than desired because the selected answering pipeline may not produce the best answers.

The cognitive solution developer may also experience further challenge when faced with multiple answering pipeline cognitive services that are intended to answer the same types of questions, but they may have different data sources or may have been trained differently. In some cases, the developer may simply choose the answer or answers from the answering pipeline that has the highest confidence top answer or answers, however this may also be less accurate than desired because the selected answering pipeline may not produce the best answers.

Finally, the cognitive solution developer may run each of the applicable answering pipelines individually, receive the list of the highest confidence answers from each, and merge the lists into one list, that may be sorted by, for example, the highest confidence value assigned to each (by the different answering pipelines). However, the confidence values from the different answering pipelines may be incomparable types due to being generated by distinct cognitive models, and thus using them interchangeably may result in inaccuracies.

In embodiments, the initial "conversion" may occur through a calibration of the different answering pipelines, using a probabilistic weighted voting mechanism. A system may first receive a set of test questions to be processed by each answering pipeline, in order to generate a set of answer data for each question. The set of test questions may be processed by a first answering pipeline to obtain a set of answers, and their confidence values, for each test question. The processing of each test question may generate a set of answers and compare them with an answer key entry associated with the test question to ascertain which of the answers are correct for the test question. Using this first set of answers, along with their confidence and correctness values, the system may generate a set of metadata for the first answering pipeline to reflect various levels of accuracy and confidence probabilities.

In embodiments, the same set of test questions may be processed by a second answering pipeline. A second set of answer data, including the set of answers as well as their confidence and correctness values, may be generated. Using this second set of answer data, the system may generate another set of metadata for the second answering pipeline to reflect various levels of accuracy and confidence probabilities. The metadata from the first and second pipelines may be stored in profiles, referred to herein as a "first blending profile" and a "second blending profile", respectively.

In embodiments, a system may receive a question for processing by a plurality of question answering pipelines. In response, the system may generate a first set of question answer data using the first pipeline. The question answer data may include a set of answers and a set of confidence values. These confidence values ("first pipeline confidence values") may be values assigned to each answer that indicate the pipeline's confidence in the accuracy of the answer. The system may also generate a set of question answer data for the question using the second answering pipeline. Like the first set of question answer data, the second set of question answer data may include a second set of answers as well as a set of second pipeline confidence values for each answer in the second set of answers. In embodiments, the system may then transmit these blending profiles to a user for use in answering a question. This user may be a cognitive solution developer, a user client device, an external system, or another user. In embodiments, the system may then store the profiles, transmit them to an external system, or communicate them to the same or another system, as is appropriate for the various QA systems.

Using the first blending profile and a weighting formula, the system may determine a vote weight for each answer in the set of question answer data. Similarly, using the second blending profile and the same weighting formula, the system may determine a vote weight for each answer in the second set of question answer data. The system can then compare the vote weights assigned to each answer (from each of the pipelines), and select, from the combined sets, an answer with the highest vote weight. This answer can be considered the best or highest confidence answer to the question. In embodiments, the system can return a single answer with a vote weight attached, top answers with vote weights attached, or another result as determined by user configured settings, a system administrator, or in another way.

Figure 2:
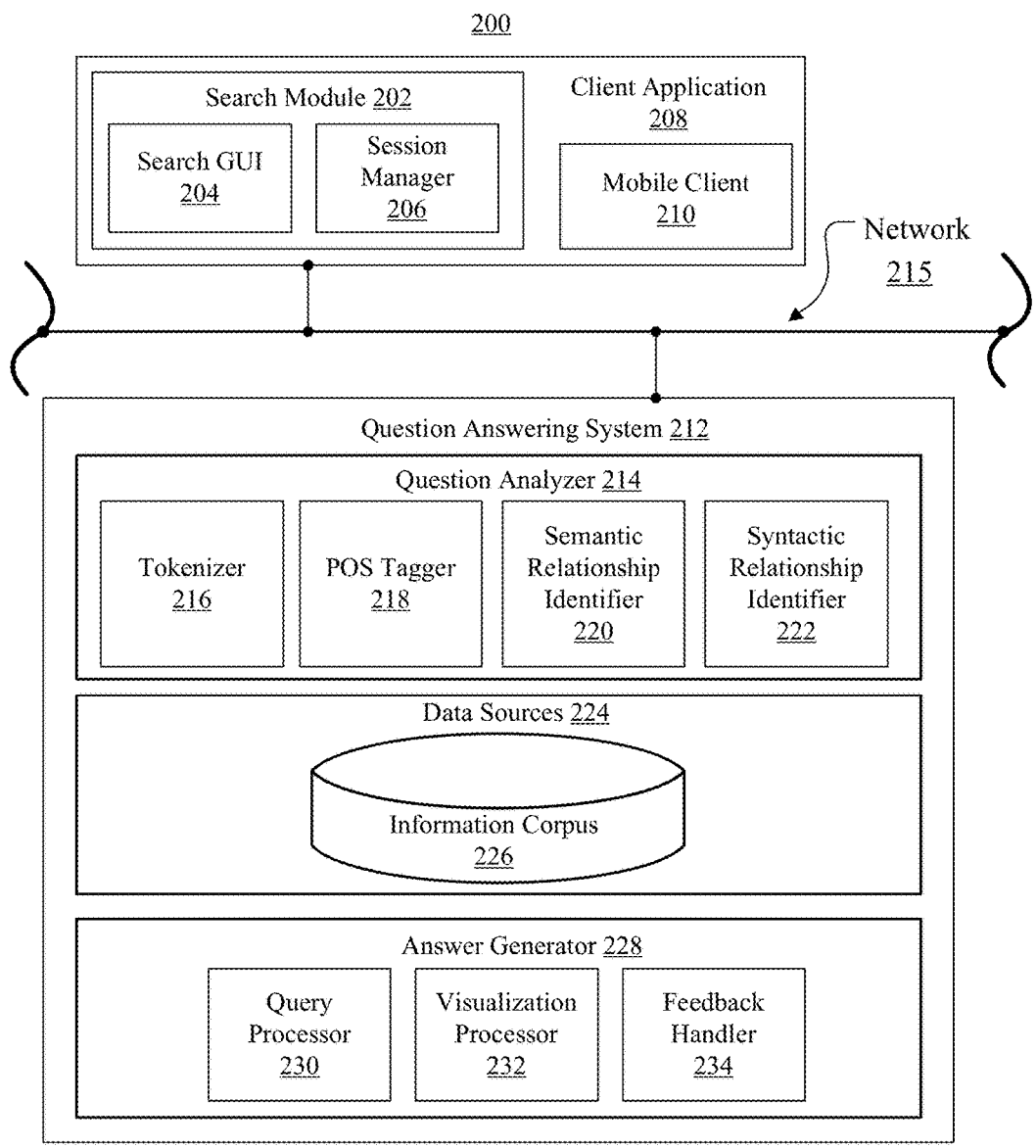
FIG. 2 depicts a block diagram of an example question answering system usable to generate answers to one or more input questions, according to embodiments of the present disclosure.
Figure 3:
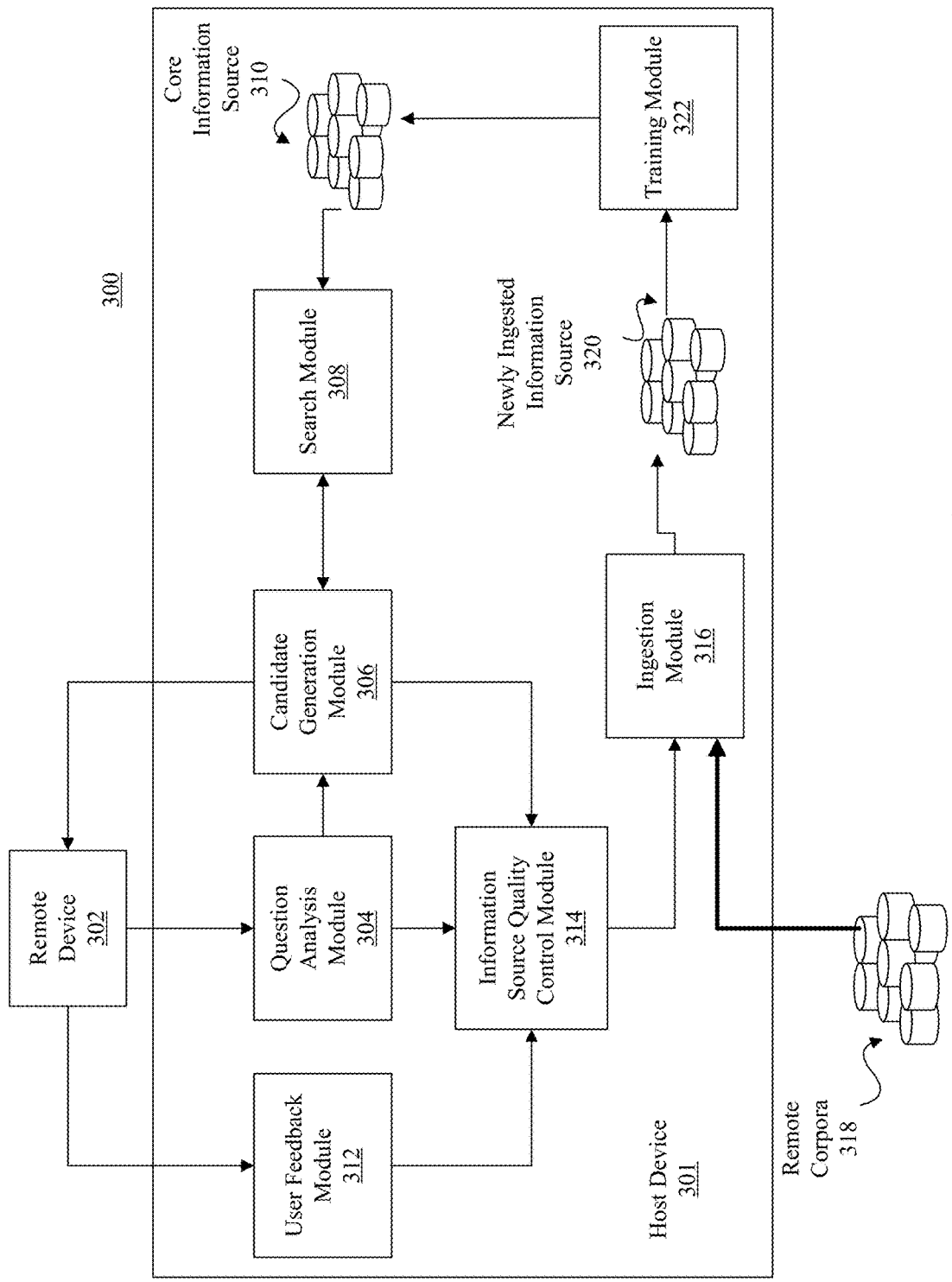
FIG. 3 depicts a block diagram of an example high level logical architecture of a QA system, according to embodiments of the present disclosure.

As discussed above, aspects of the disclosure may relate to QA systems. Accordingly, an understanding of the embodiments of the present invention may be aided by describing embodiments of these QA systems and the environments in which these systems may operate. FIGS. 1-3 depict example natural language processing systems, for example QA systems, which may be integrated with, expanded upon, or otherwise modified, according to embodiments of the present disclosure.

FIG. 1 depicts a block diagram of an example computing environment 100 for use with a question answering system, according to embodiments of the present disclosure. In some embodiments, the computing environment 100 may include one or more remote devices 102, 112 and one or more host devices 122. Remote devices 102, 112 and host device 122 may be distant from each other and communicate over a network 150 in which the host device 122 comprises a central hub from which remote devices 102, 112 can establish a communication connection. Alternatively, the host device and remote devices may be configured in any other suitable relationship (e.g., in a peer-to-peer or other relationship).

In some embodiments, the network 150 can be implemented by any number of any suitable communications media (e.g., wide area network (WAN), local area network (LAN), Internet, Intranet, etc.). Alternatively, remote devices 102, 112 and host devices 122 may be local to each other, and communicate via any appropriate local communication medium (e.g., local area network (LAN), hardwire, wireless link, Intranet, etc.). In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers, hundreds or thousands of them or more, disposed within one or more data centers and configured to share resources over the network 150.

In some embodiments, host device 122 may include a question answering system 130 having a search module 134 and an answer module 132. The search module may be implemented by a conventional or other search engine, and may be distributed across multiple computer systems. The search module 134 may be configured to search one or more databases or other computer systems for content that is related to a question input by a user at a remote device 102, 112.

In some embodiments, remote devices 102, 112 may enable users to submit questions (e.g., search requests or other user queries) to host devices 122 to retrieve search results. For example, the remote devices 102, 112 may include a query module 110, 120 (e.g., in the form of a web browser or any other suitable software module) and present a graphical user interface or other interface (e.g., command line prompts, menu screens, etc.) to solicit queries from users for submission to one or more host devices 122 and to display answers/results obtained from the host devices 122 in relation to such user queries.

Consistent with various embodiments, host device 122 and remote devices 102, 112 may be computer systems, and may each be equipped with a display or monitor. The computer systems may include at least one processor 106, 116, 126; memories 108, 118, 128; internal or external network interface or communications devices 104, 114, 124 (e.g., modem, network cards, etc.); optional input devices (e.g., a keyboard, mouse, or other input device); and any commercially available or custom software (e.g., browser software, communications software, server software, natural language processing software, search engine and/or web crawling software, filter modules for filtering content based upon predefined criteria, etc.). In some embodiments, the computer systems may include servers, desktops, laptops, and hand-held devices. In addition, the answer module 132 may include one or more modules or units to perform the various functions of embodiments as described below (e.g., receiving an input question, assigning the input question to a question category, determining a set of candidate answers, comparing confidence scores and user feedback to confidence criteria, etc.), and may be implemented by any combination of any quantity of software and/or hardware modules or units.

FIG. 2 depicts a block diagram of an example question answering system usable to generate answers to one or more input questions, according to embodiments of the present disclosure. Aspects of FIG. 2 are directed toward an exemplary system architecture 200, including a question answering system 212 to generate answers to user queries (e.g., input questions). In some embodiments, one or more users can send requests for information to QA system 212 using a remote device (such as remote devices 102, 112 of FIG. 1). Such a remote device may include a client application 208 which may itself involve one or more entities operable to generate information that is then dispatched to QA system 212 via network 215. QA system 212 may be able to perform methods and techniques for responding to the requests sent by the client application 208. In some embodiments, the information received at QA system 212 may correspond to input questions received from users, where the input questions may be expressed in a free form and in natural language. In embodiments, and as described herein, multiple QA systems like QA system 212 may exist, the answers from which may be blended as described herein.

A question (similarly referred to herein as a user query) may be one or more words that form a search term or request for data, information, or knowledge. A question may be expressed in the form of one or more keywords. Questions may include various selection criteria and search terms. A question may be composed of complex linguistic features in addition to keywords. However, a keyword-based search for answers may also be possible. In some embodiments, using restricted syntax for questions posed by users may be enabled. The use of restricted syntax may result in a variety of alternative expressions that assist users in better stating their needs.

Consistent with various embodiments, client application 208 may operate on a variety of devices. Such devices may include, but are not limited to, mobile and handheld devices (e.g., laptops, mobile phones, personal or enterprise digital assistants, and the like), personal computers, servers, or other computer systems that access the services and functionality provided by QA system 212. In some embodiments, client application 208 may include one or more components, such as a mobile client 210. Mobile client 210, acting as an agent of client application 210, may dispatch user query requests to QA system 212.

Consistent with various embodiments, client application 208 may also include a search module 202, either as part of mobile client 210 or separately, that may perform several functions, including some or all of the above functions of mobile client 210 listed above. For example, in some embodiments, search module 202 may dispatch requests for information to QA system 212. In some embodiments, search module 202 may be a client application to QA system 212. Search module 202 may send requests for answers to QA system 212. Search module 202 may be installed on a personal computer, a server, or other computer system.

In some embodiments, search module 202 may include a search graphical user interface (GUI) 204 and session manager 206. In such situations, users may be able to enter questions in search GUI 204. In some embodiments, search GUI 204 may be a search box or other GUI component, the content of which can represent a question to be submitted to QA system 212. Users may authenticate to QA system 212 via session manager 206. In some embodiments, session manager 206 may keep track of user activity across sessions of interaction with the QA system 212. Session manager 206 may also keep track of what questions are submitted within the lifecycle of a session of a user. For example, session manager 206 may retain a succession of questions posed by a user during a session. In some embodiments, answers produced by QA system 212 in response to questions posed throughout the course of a user session may also be retained. Information for sessions managed by session manager 206 may be shared between computer systems and devices.

In some embodiments, client applications 208 and QA system 212 may be communicatively coupled through network 215, e.g., the Internet, intranet, or other public or private computer network. In some embodiments, QA system 212 and client application 208 may communicate by using Hypertext Transfer Protocol (HTTP) or Representational State Transfer (REST) calls. In some embodiments, QA system 212 may reside on a server node. Client application 208 may establish server-client communication with QA system 212 or vice versa. In some embodiments, the network 215 can be implemented within a cloud computing environment, or using one or more cloud computing services.

Consistent with various embodiments, QA system 212 may respond to the requests for information sent by client applications 208 (e.g., questions posed by users). QA system 212 may generate answers to the received questions. In some embodiments, QA system 212 may include a question analyzer 214, data sources 224, and answer generator 228. Question analyzer 214 may be a computer module that analyzes the received questions. Question analyzer 214 may perform various methods and techniques for analyzing the questions syntactically and semantically. In some embodiments, question analyzer 214 can parse received questions. Question analyzer 214 may include various modules to perform analyses of received questions. For example, computer modules that question analyzer 214 may encompass include, but are not limited to, a tokenizer 216, part-of-speech (POS) tagger 218, semantic relationship identifier 220, and syntactic relationship identifier 222. In embodiments, question analyzer 214 may include a question classifier, as described herein, in order to identify a type or class to which the question belongs.

Consistent with various embodiments, tokenizer 216 may be a computer module that performs lexical analysis. Tokenizer 216 can convert a sequence of characters into a sequence of tokens. A token may be a string of characters typed by a user and categorized as a meaningful symbol. Further, in some embodiments, tokenizer 316 can identify word boundaries in an input question and break the question or any text into its component parts such as words, multi-word tokens, numbers, and punctuation marks. In some embodiments, tokenizer 216 can receive a string of characters, identify the lexemes in the string, and categorize them into tokens.

Consistent with various embodiments, POS tagger 218 may be a computer module that marks up a word in a text to correspond to a particular part of speech. POS tagger 218 can read a question or other text in natural language and assign a part of speech to each word or other token. POS tagger 218 can determine the part of speech to which a word corresponds based on the definition of the word and the context of the word. The context of a word may be based on its relationship with adjacent and related words in a phrase, sentence, question, or paragraph. In some embodiments, the context of a word may be dependent on one or more previously posed questions. Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, POS tagger 218 may tag or otherwise annotate tokens of a question with part of speech categories. In some embodiments, POS tagger 218 may tag tokens or words of a question to be parsed by QA system 212.

Consistent with various embodiments, semantic relationship identifier 220 may be a computer module that can identify semantic relationships of recognized entities (e.g., words, phrases, etc.) in questions posed by users. In some embodiments, semantic relationship identifier 220 may determine functional dependencies between entities and other semantic relationships.

Consistent with various embodiments, syntactic relationship identifier 222 may be a computer module that can identify syntactic relationships in a question composed of tokens posed by users to QA system 212. Syntactic relationship identifier 222 can determine the grammatical structure of sentences, for example, which groups of words are associated as "phrases" and which word is the subject or object of a verb. Syntactic relationship identifier 222 may conform to formal grammar.

In some embodiments, question analyzer 214 may be a computer module that can parse a received user query and generate a corresponding data structure of the user query. For example, in response to receiving a question at QA system 212, question analyzer 214 may output the parsed question as a data structure. In some embodiments, the parsed question may be represented in the form of a parse tree or other graph structure. To generate the parsed question, question analyzer 214 may trigger computer modules 216-222. Additionally, in some embodiments, question analyzer 214 may use external computer systems for dedicated tasks that are part of the question parsing process.

Consistent with various embodiments, the output of question analyzer 214 may be used by QA system 212 to perform a search of one or more data sources 224 to retrieve information to answer a question posed by a user. In some embodiments, data sources 224 may include data warehouses, information corpora, data models, and document repositories. In some embodiments, the data source 224 may include an information corpus 226. The information corpus 226 may enable data storage and retrieval. In some embodiments, the information corpus 226 may be a storage mechanism that houses a standardized, consistent, clean and integrated form of data. The data may be sourced from various operational systems. Data stored in the information corpus 226 may be structured in a way to specifically address reporting and analytic requirements. In some embodiments, the information corpus may be a relational database. In some example embodiments, data sources 224 may include one or more document repositories.

In some embodiments, answer generator 228 may be a computer module that generates answers to posed questions. Examples of answers generated by answer generator 228 may include, but are not limited to, answers in the form of natural language sentences; reports, charts, or other analytic representation; raw data; web pages; and the like.

Consistent with various embodiments, answer generator 228 may include query processor 230, visualization processor 232, and feedback handler 234. When information in a data source 224 matching a parsed question is located, a technical query associated with the pattern can be executed by query processor 230. Based on data retrieved by a technical query executed by query processor 230, visualization processor 232 may be able to render visualization of the retrieved data, where the visualization represents the answer. In some embodiments, visualization processor 232 may render various analytics to represent the answer including, but not limited to, images, charts, tables, dashboards, maps, and the like. In some embodiments, visualization processor 232 may present the answer to the user.

In some embodiments, feedback handler 234 may be a computer module that processes feedback from users on answers generated by answer generator 228. In some embodiments, users may be engaged in dialog with the QA system 212 to evaluate the relevance of received answers. Answer generator 228 may produce a list of answers (e.g., candidate answers) corresponding to a question submitted by a user. The user may rank each answer according to its relevance to the question. In some embodiments, the feedback of users on generated answers may be used for future question answering sessions.

In embodiments, a set of test questions may be used with the QA system 112, and the generated answers may be considered the set of test question data. Each QA system in a set of QA systems may be calibrated as described herein in order to allow for a relevant comparison between the generated and scored answers from each of their respective answer generators 228.

The various components of the exemplary question answering system described above may be used to implement various aspects of the present disclosure. For example, the client application 208 could be used to receive an input question from a user. The question analyzer 214 could, in some embodiments, be used to analyze the input question to determine to which question category the input question should be assigned. Further, the query processor 230 or the answer generator 228 could, in some embodiments, be used to determine a set of candidate answers and calculate confidence scores for the candidate answers.

FIG. 3 depicts a block diagram of an example high level logical architecture of a QA system, consistent with embodiments of the present disclosure. Aspects of FIG. 3 may be directed toward components and modules for use with a QA system 300. In some embodiments, host device 301 and remote device 302 may be embodied by host device 122 and remote device 102 of FIG. 1, respectively. In some embodiments, the question analysis module 304, located on host device 301, may receive a natural language question (e.g., an input question) from a remote device 302, and can analyze the question to produce information about the question based on the question's content and context. This may be accomplished, for example, by using components 216-222 of FIG. 2. The information produced by question analysis module 304 may include, for example, the semantic type of the expected answer. In addition the question analysis module 304 may assign a question category to the input question and provide this information to the information source quality control module 314. As used herein question categories may refer to any suitable groupings of input questions wherein a determination as to the appropriate category for a given question is made at least in part based on an analysis of the content of the question itself. In some embodiments, a single given question may be included in multiple question categories.

Next, the candidate generation module 306 may formulate queries from the output of the question analysis module 304 and then pass these queries on to search module 308 which may consult various resources such as the internet or one or more knowledge resources, e.g., databases or corpora, to retrieve documents that are relevant to answering the user question. As used herein, documents may refer to various types of written, printed, or electronic matter (including passages, web-pages, database tuples, etc.) that provide information or evidence. As shown in FIG. 3, the search module 308 may consult core information source 310. As used herein, a core information source may refer to any document or group of documents that is used by a relevant QA system to identify candidate answers to user questions. The candidate generation module 306 may extract, from the search results obtained by search module 308, potential (candidate) answers to the question, which it may then score (e.g., with confidence scores) and rank. A final set of candidate answers, based on a comparison of various confidence scores associated with the candidate answers, may then be sent from the candidate generation module 306 to remote device 302 for presentation to the user. In addition, this information about candidate answers and confidence scores may also be sent to information source quality control module 314. A user may respond, via remote device 302, to the candidate answers (for example, by indicating that none of the provided candidate answers are accurate or relevant) through user feedback module 312. The user feedback module 312 may then provide this feedback to the information source quality control module 314.

In some embodiments, the information source quality control module 314 may compile and analyze information that it receives during the course of normal operations of question and answering system 300. This received information (e.g., information from question analysis module 304, candidate generation module 306, and user feedback module 312) may be usable by the information source quality control module 314 to determine whether one or more new information sources should be ingested. When the information source quality control module 314 determines that a new information source having certain characteristics is needed (e.g., an information source that is associated with a specific question category), it may instruct an ingestion module 316 accordingly. Based on these instructions, ingestion module 316 may search one or more remote sources, such as remote corpora 318, in an attempt to locate one or more suitable new information sources. In some embodiments, once discovered, these new information sources may be ingested by ingestion module 316 and become newly ingested information source 320. This information source may in turn be analyzed by training module 322. This training analysis may take the form of obtaining training candidate answers to training questions using the newly ingested information source 320 and then reviewing the quality of these training answers. As used herein, training questions may refer to predetermined questions that are used by a QA system for either (1) reviewing or determining the quality or characteristics of an information source used to identify training candidate answers to these questions, (2) creating or refining machine learning models and routing paths usable by the QA system, or both. In some embodiments, once a threshold level of confidence in the new information source is met, it may be combined with core information source 310 and used to answer new input questions as they are received from users.

The various components and modules of the exemplary high level logical architecture for a QA system described above may be used to implement various aspects of the present disclosure. For example, the question analysis module 304 may, in some embodiments, be used to obtain input questions and assign these input questions to appropriate question categories. Further, the candidate generation module 306 and search module 308 may together, in some embodiments, be used to perform searches of core information source 310, generate candidate answers, calculate confidence scores associated with these candidate answer, and provide these candidate answers to one or more users. Further, the information source quality control module 314 may, in some embodiments, be used to analyze confidence scores and determine whether the confidence scores fail to meet one or more confidence criteria. Further, ingestion module 316 may, in some embodiments, be used to ingest new information sources (in response to an indication from the information source quality control module 314 that a confidence criterion has not been satisfied).

Figure 4:
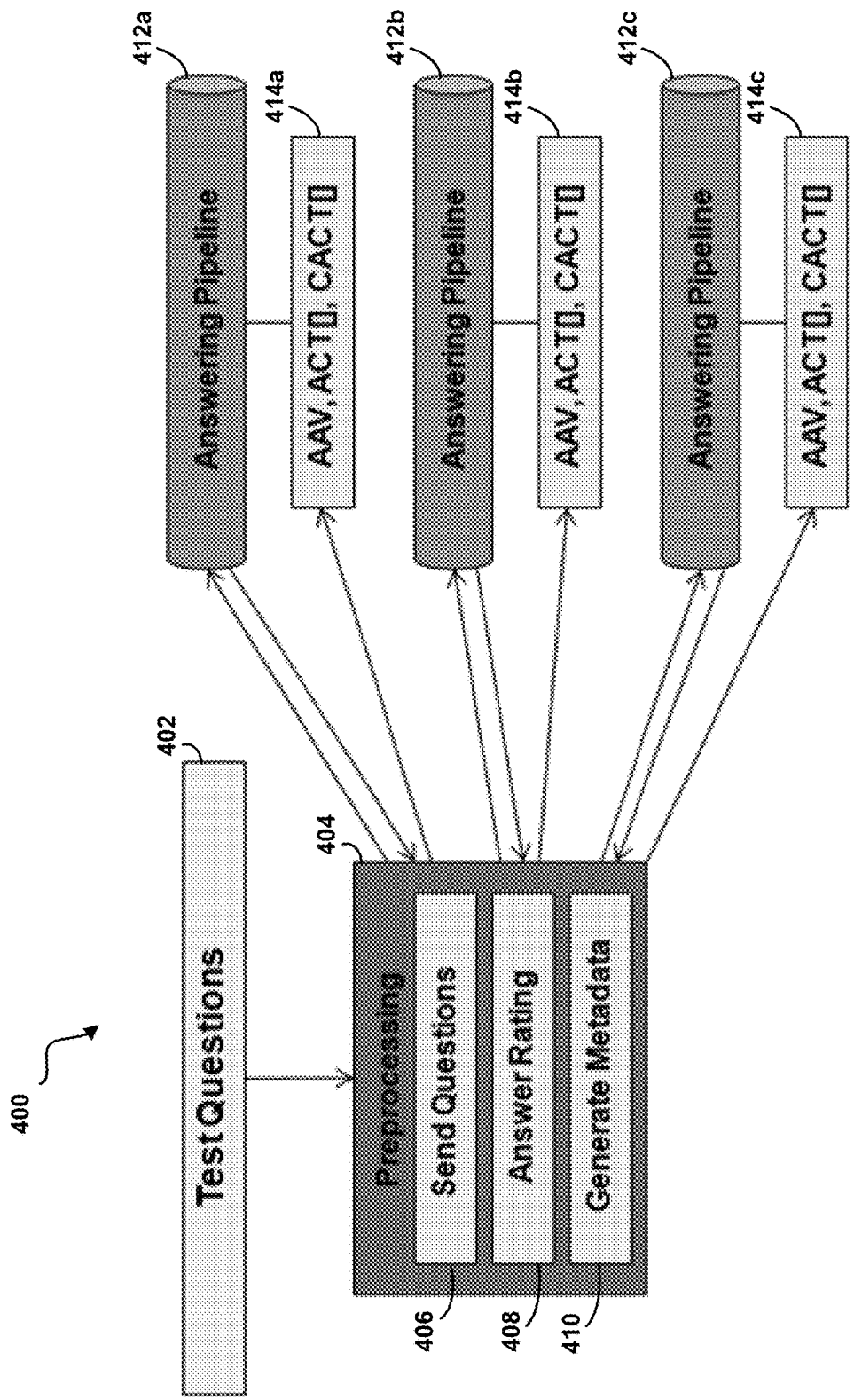
FIG. 4 depicts a diagram of an illustrative embodiment of a system for generating metadata for a set of QA pipelines, according to embodiments of the present disclosure.

FIG. 4 depicts a diagram of an illustrative embodiment of a system 400 for generating metadata for a set of QA pipelines, according to embodiments of the present disclosure. The system 400 may be executed over a computer processor system, or over a series of processors including those connected locally, on the cloud, or in another way. A set of test questions 402 may be received by the system for preprocessing 404. In embodiments, the test questions 402 may be a set of one or more test questions generated by the system, by a subject matter expert, or in another way. Each question in the set of test questions 402 may have an associated entry in an answer key, which indicates the correct or most correct answers to the particular question.

As part of preprocessing 404, the system may send the questions, per 406, to each of the answering pipelines 412a, 412b, and 412c. In some embodiments, a user or other process within the system may assign the question to a particular answering pipeline or set of answering pipelines. In other embodiments, the test question may be sent without previous sorting, to each of the answering pipelines 412. The question may be processed by each answering pipeline 412, and the answering pipeline 412 can return a set of answer data. This answer data can include a set of answers to the question as well as a confidence value for each answer. The confidence value may indicate the answer pipeline's estimate of the likelihood that the particular answer is a suitable answer to the test question.

The system can then determine an answer rating 408 for each answer, based on the returned set of test answer data from each answering pipeline 412. In embodiments, the answer rating can be a determination of whether or not the answer is considered correct, based on a comparison of the returned answer with an answer key entry. The content of the answer key may have previously been created by a subject matter expert. In embodiments, the same answer key can be used for the accuracy determination of each pipeline.

Using the confidence values and answer ratings of the answers, the system can then generate metadata 410 to create a blending profile 414a-c for each of the answering pipelines 412. The metadata calculated for each profile 414 can include an "answer accuracy value", an "answer confidence table", and a "correct answer confidence table".

The first metadata value to be generated for the blending profile for a particular answering pipelines (e.g., answering pipeline 412a), may be the answer accuracy value. The answer accuracy value may indicate the probability that the particular answering pipeline (for example, answering pipelines 412a) will produce the correct answer to a question it receives.

The second metadata value set to be generated for the blending profile for a particular answering pipelines (e.g., answering pipeline 412a), may be the answer confidence table. The answer confidence table may comprise values that indicate a probability that the answering pipelines (e.g., answering pipeline 412a) will produce an answer that has a confidence of at least a particular confidence value.

The third metadata value set to be generated for the blending profile for a particular answering pipeline (e.g., answering pipeline 412a) may be the correct answer confidence table. This table can indicate the probability that the answering pipeline will produce a correct answer that has a confidence of at least a particular confidence value.

Metadata can be generated for each answering pipeline 412a, 412b, and 412c, in order to create a blending profile for each pipelines, 414a, 414b, and 414c, respectively. The blending profiles for each profile can then be transmitted to a user, to another system, to a cognitive solution developer, or to a system administrator for use in answering non-test questions within a QA system or set of QA systems. In embodiments, blending profile can be created for any number of answering pipelines, in order to facilitate for the comparison of resultant answers from each.

The following example may be carried out over the system 400 as described in FIG. 4. In an embodiment, let "N" denote the number of test set questions for a given answering pipeline, and let "K" denote an answering pipeline parameter that indicates the maximum number of answers the pipeline is configured to return in response to any question. A cognitive solution developer or other user may be expected to execute the answering pipeline on the N questions to obtain "T" answers. The value of T is at most N*K, but it may be less if the answering pipeline returns fewer than K answers for any of the questions.

The answering pipeline may also provide a confidence value "C" for each of the T answers. The value space of C is the range 0 to 1, and the value assigned to C indicates the answer pipeline's estimate of the likelihood that the answer is a suitable answer to the test question.

The cognitive solution developer or other user may then engage the service of a subject matter expert (SME). The SME may rate the degree of suitability of each answer for each test question, and thus further refine and validate the results of the particular answering pipeline. In other embodiments, a prepared answer key may be used. The answer key can be the same for all pipelines used, and contain an answer or set of answers considered to be correct.

The system can then calculate certain metadata for each answering pipeline, prior to the use of the pipeline in [non-test] question answering. To assist in calculating the metadata, an internal value referred to herein as the correct answer count or "CAC" may be determined. In embodiments, the CAC may be determined by first reducing the value space of the answering ratings, based on a configurable threshold, to a simple binary scale with "1" indicating a correct answer and "0" indicating an incorrect answer. Thus, the CAC may be the count of how many of the T answers have a 1 rating (i.e., how many of the returned answers are correct).

The first metadata value calculated, the answer accuracy value, as described herein, may indicate the probability that the answering pipeline will produce a correct answer to a question. The answer accuracy value, or "AVV", may be calculated as the ratio CAC/T (i.e., correct answers CAC over total answer T), or the number of the T answers with a "1" rating divided by the number of total number of answers T.

The second metadata value set to be generated, the answer confidence table, as described herein, may indicate the probability that the answering pipeline will produce an answer that has a confidence of a certain confidence value. The answer confidence table, or "ACT", may be computed using a configurable step value. In embodiments, this value can default to a step value of .01. For each confidence value, or "CV", from 0 to 1, according to the step value, a number of correct answers, or "NCA", can be calculated to reflect the number of the T answers that have a confidence value C of at least CV. The ACT location CV may then be associated with NCA/T, denoted ACT[CV]=NCA/T. Thus, each value ACT[CV] (in the ACT) may indicate the probability that the answering pipeline will produce an answer that has a confidence of at least CV.

The third metadata value set to be generated, the correct answer confidence table, as described herein, may contain a set of values which each indicate that the answering pipeline will produce an answer that has a confidence of at least a particular confidence value, when the answering pipeline produces a correct answer. The correct answer confidence table, or "CACT", may be computed using a configurable step value. In embodiments, this value can default to a step value of .01. For each confidence value CV from 0 to 1 according to the step value, the invention may calculate a number, "NCCA" of the T answers that have a 1 rating and a confidence value C or at least CV. Then, the ACT location CV may be associated with NCCA/CAC, denoted ACT[CV]=NCCA/CAC. Thus, each value CACT[CV] may indicate the probability that the answering pipeline will produce an answer that has a confidence of at least CV when the answering pipeline produces a correct answer.

Figure 5:
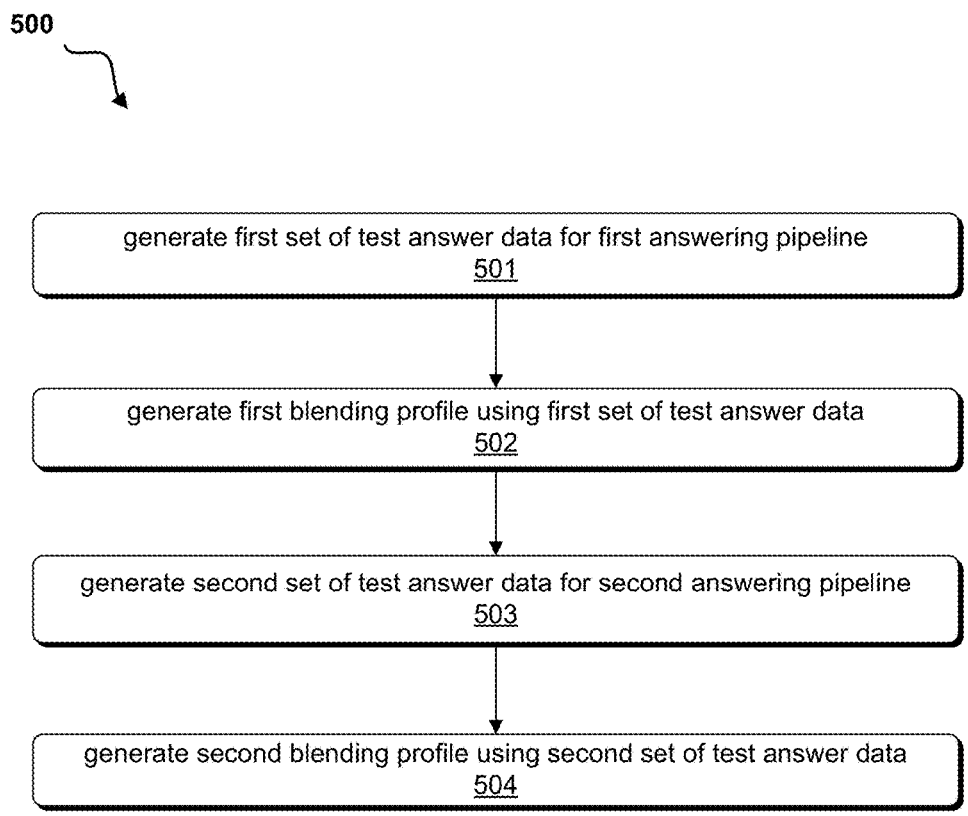
FIG. 5 depicts a flow diagram of a method for calibrating a set of QA pipelines, according to embodiments of the present disclosure.

FIG. 5 depicts a flow diagram of a method 500 for calibrating a set of QA pipelines, according to embodiments of the present disclosure. In embodiments, this calibration may occur via the creation of metadata for blending profiles, as described in FIG. 4. In embodiments, the method 500 may begin when a first set of test answer data is generated for a first answering pipeline, per 501. The test answer data may be the output of a QA system, for example, the QA system described in FIG. 3, and may comprise a set of answers to a processed question as well as one or more confidence values associated with the particular answer. The answer data may include other data or metadata, as is relevant to the particular QA system processing the question and generating the test answer data.

The system may generate a first blending profile using the first set of test answer data, per 502. The blending profile may include metadata generated by the system using the first set of test answer data, including the answers and the confidence value. In the generation of the first blending profile, the system may compare, with an answer key, the answers in the test answer data.

A second set of test answer data may be generated by use of the second answering pipeline, per 503. Using the set of test answer data for the second answering pipeline, the system may generate a second blending profile, per 504. The second blending profile may comprise metadata values including, for example, those described in FIG. 4, such as the answer accuracy value, an answer confidence table, and the correct answer confidence table.

Test answer data and blending profiles may be generated for a number of answering pipelines, as is appropriate to the particular problem, solution, or QA environment. The blending profiles may then be stored or transmitted for use in answering a question or set of non-test questions.

Figure 6:
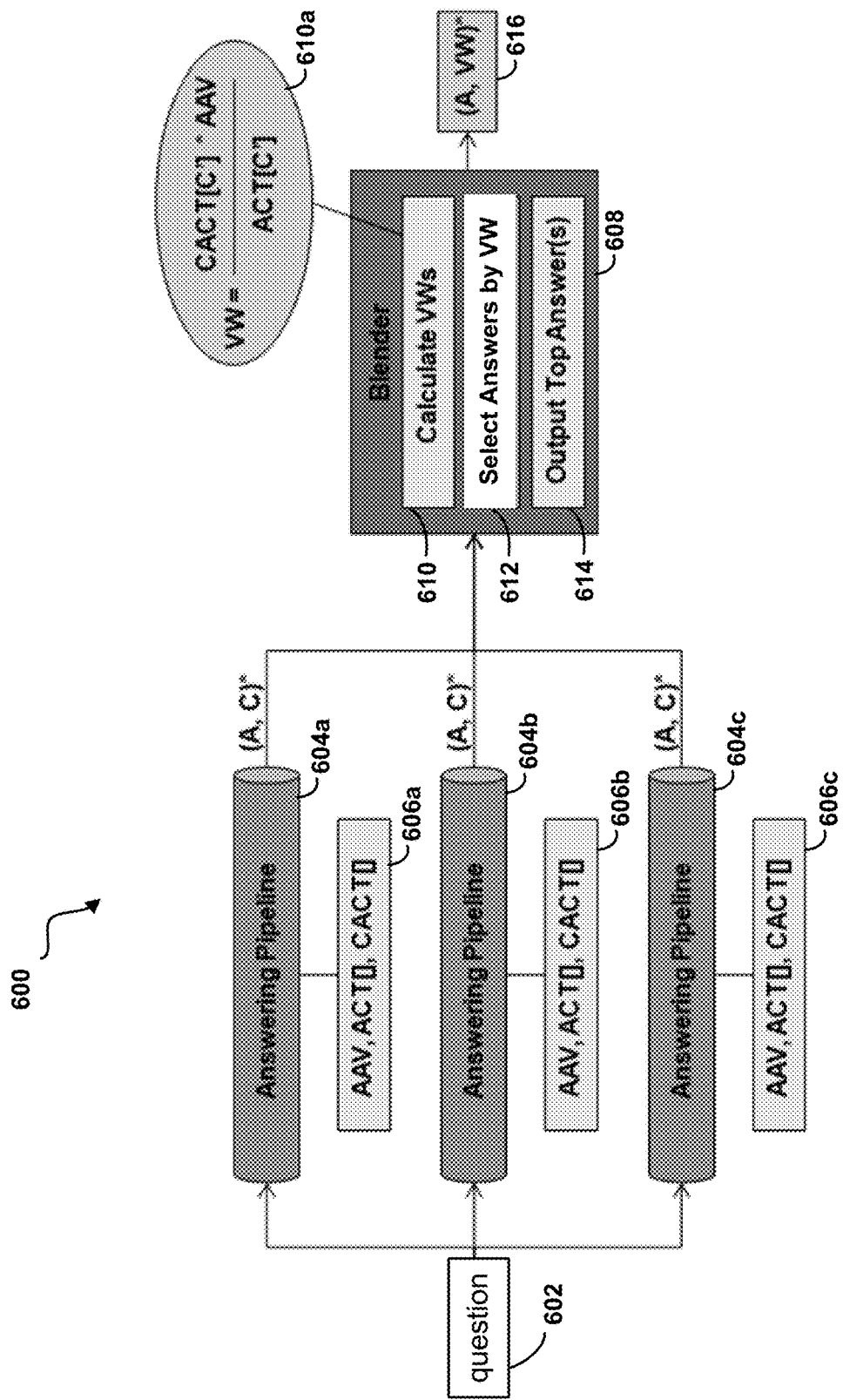
FIG. 6 depicts a diagram of an illustrative embodiment of a system for blending answers from a set of answering pipelines, according to embodiments of the present disclosure.

FIG. 6 depicts a diagram of an illustrative embodiment of a system 600 for blending answers from a set of answering pipelines, according to embodiments of the present disclosure. In embodiments, a question 602 may be provided to the answering pipelines 604 for processing. The result of the processing may be a set of question answer data, including, for example an answer or set of answers ("A") and a confidence value for each answer ("C"). The system may obtain blending profiles 606 for each answering pipeline. In embodiments, the elements described in FIG. 6 including the answering pipelines 604 and the blending profiles 606 may be analogous to those described in FIG. 4, including for example, the answering pipelines 412 and blending profiles 414. The question 602 may be processed in a similar manner as a question from the set of test questions 402 of system 400 in FIG. 4. However, the question in FIG. 6 may be an actual (i.e., non-test) question submitted by a user, and the blending profiles can comprise the metadata created based on the processes described in FIGS. 4 and 5.

In embodiments, the "blender" 608 may be a computer system for blending the answers from numerous pipelines 604. The blender 608 may receive the question answer data from each of the pipelines 604, along with the blending profiles 606 (e.g., blending profiles created via generation of metadata value sets as described in FIGS. 4 and 5). The blender 608 may then calculate a vote weight for each answer from each of the pipelines 610, using the metadata in the blending profile 606. In one embodiment, blender 608 is configured to only retain from each answering pipeline the J answers with the highest confidence value, for some configurable value J.

In some embodiments, the vote weight can be calculated for each answer. A vote weight of each answer may represent the probability that it is a correct answer given that the answering pipeline assigned it a confidence of at least C'. The vote weight may be calculated in some embodiments using the formula: CACT[C']*AVV/ACT[C'], as depicted at 610*a*. Each of these values may be determined using the metadata calculated for each answering pipeline blending profile. As described herein, CACT[C'] may be a particular confidence "C'" location on the correct answer confidence table. AVV may be the answer accuracy value, calculated as described herein; and ACT[C] may be a particular location on the answer confidence table keyed using the particular confidence "C'". In embodiments, C' may be the answer's confidence (as provided by the answering pipelines 604) truncated to the nearest confidence step value. For example, if the answering pipeline provided answer confidence C was 0.926 and the step value was .01, then C' could be 0.92. The generated metadata enables the formula to calculate an answer's vote weight based on the probability that its confidence is at least C' (assuming the answer is correct), multiplied by the probability of the answer being correct, and then divided by the probability that its confidence is at least C'.

In embodiments, the blender 608 may then select a top answer or list of top answers based on the calculated vote weights, 612. In one embodiment, blender 608 may combine the answers from all the answering pipelines by sorting the answers from greatest to least vote weight and the selecting the top "K" answers (where "K" is based on, for example, a configurable setting) from the beginning of the sorted list. In another embodiment, blender 608 selects the answer with the highest vote weight from all answer pipeline lists, adds it to the output list, and then removes it from the answer pipeline list. This sequence may be iterated "K" times to select the top "K" answers. The blender 608 can then output, to a user or other system, the "K" top answers 614. The answer may be output by the blender 608 in the form depicted at 616 to including the answer "A" and the vote weight "VW". In this way, the answers output by each of the answering pipelines 604 may be compared amongst one another, regardless of the processing used by each particular answering pipeline 604.

Figure 7:
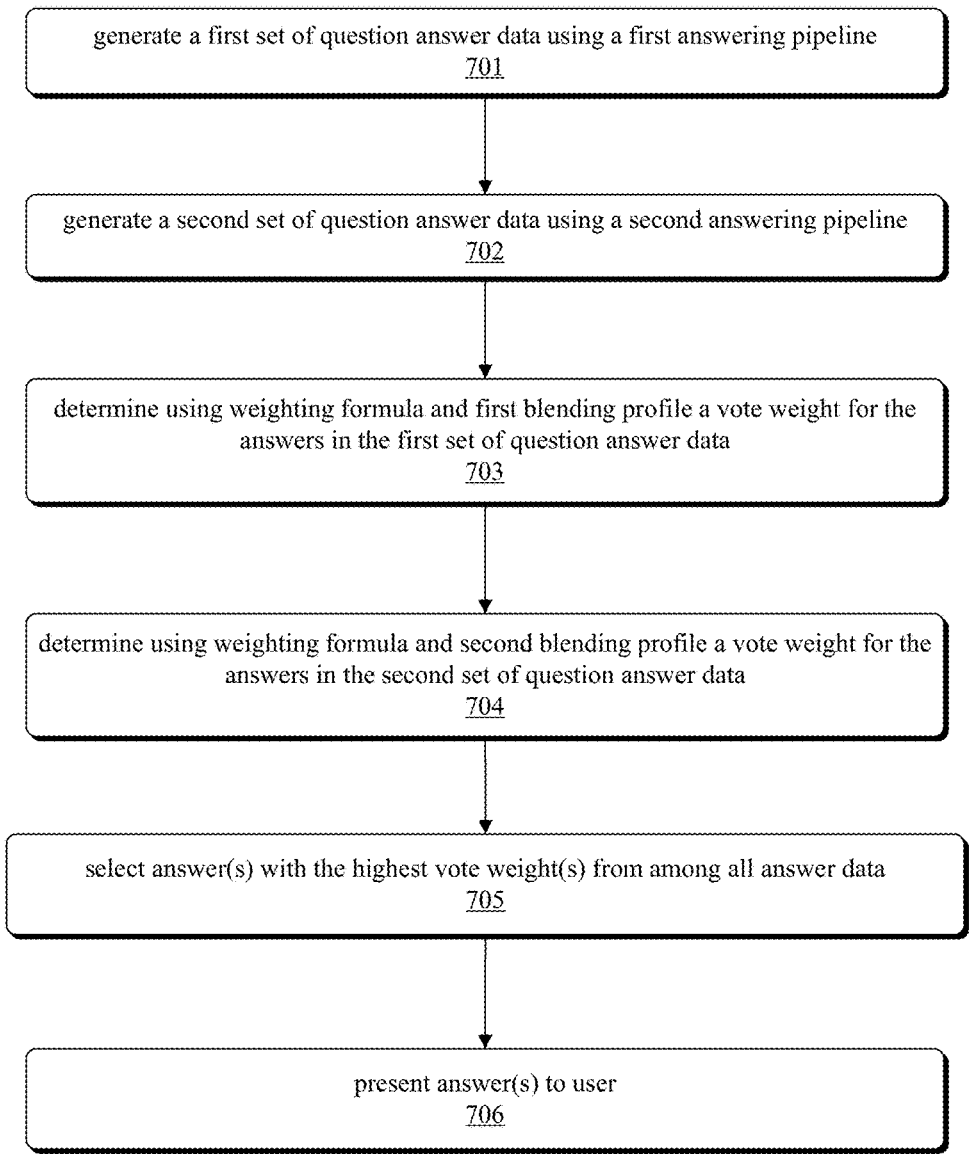
FIG. 7 depicts a flow diagram of a method for blending answers from a set of QA pipelines, according to embodiments of the present disclosure.

FIG. 7 depicts a flow diagram of a method for blending answers from a set of QA pipelines, according to embodiments of the present disclosure. At 701, a system may generate a first set of question answer data using a first answering pipeline. This question answer data may result from the processing of a question or query by the first answering pipeline. The question answer data may include a set of one or more answers to the question, as determined by the first answering pipeline. The question answer data may also include a confidence value for each answer generated by the first answering pipeline. As described herein, the confidence value may indicate the answering pipeline's estimate of the likelihood that the answer is a suitable answer to the question. The system may then generate a second set of question answer data using a second answering pipeline, per 702. This process may mirror that of the generation of the question answer data for the first answering pipeline, as described at 701. In embodiments, the process of question answer data generation may be repeated for each pipeline, as determined by the number of different pipelines being utilized by the QA blending system.

The QA blending system can then determine a vote weight for the answers in the first set of question answer data, per 703. The system can determine the vote weight using a weighting formula, for example the weighting formula described in FIG. 6, and the first blending profile. The system can then determine a vote weight for each of the answers in the second set of question answer data, using the same weighting formula as used for the first set of question answer data and the second blending profile, per 704. The system can then select an answer or set of answers with the highest vote weight or highest vote weights from among all the answer data, per 705. This answer or set of answers can be presented or returned to a user, per 706. In embodiments, the answer or set of answers can each be presented with its corresponding vote weight or their corresponding vote weights.

In embodiments, a question classifier may be used in conjunction with the QA blending system described herein. The question classifier may be integrated with the system's overall processing of the question, in order to provide a more precise confidence value based on a type or class of question.

In embodiments, the question classifier may be integrated with the QA system by generating a question classifier confidence value for each question in the set of test questions for each pipeline. For example, question classifier confidence values A1, B1, and C1, may be calculated for each question A, B, and C in the set of test questions, in relation to the first answering pipeline. For each question, the question classifier confidence value can be combined with the confidence value of each answer from the pipeline, such as by multiplying them, to produce a revised confidence value for the answer in the test answer data for the pipeline. This process can be repeated for the second answering pipeline (and any additional answering pipelines). In this way, the revised confidence value for each answer takes into account the type of question being answered and the extent to which the QA system's question classifier has been trained to prefer the answers from a particular answering pipeline for a particular question type.

In other embodiments, the system may generate a first question classifier confidence value for the question submitted to the system. The question classifier could determine a confidence that the question is associated with one or more question types. In embodiments, each question type could be associated with a distinct answering pipeline. Thus, the question classifier confidence value produced by the question classifier could indicate a determined level of appropriateness that the particular answering pipeline is the correct pipelines to be used in answering the question. In embodiments, the data contained within the question answer data set may be modified based on the use of a question classifier.

For example, the first answering pipeline may generate a set of question answer data, in response to receiving a question. The question classifier confidence value may be determined for the question, as described above. The question classifier confidence value may then be combined with the confidence value in the question answer data generated by the first answering pipeline, such as by multiplying them, to produce a revised confidence value in the question answer data. Similarly, the second answering pipeline may combine a generated question classifier confidence value with the standard confidence value. This new value (question classifier confidence value combined with second answering pipeline answering confidence value) may replace the confidence value in the generation of the question answer data set. In this way, the question classifier may impact the determined confidence of an answer, when used with the disclosed QA system blending.

In other embodiments, the vote weight as described, for example, at FIG. 6, may be impacted by the question classifier. As noted, the vote weight for a particular answer in a particular pipeline may be calculated by multiplying the CACT probability/ACT probability ratio by the particular AAV. When using a question classifier, the product of the aforementioned may be further multiplied by the confidence value obtained from the question classifier for the particular question type associated with a particular answering pipeline. This process may be repeated for each of the pipelines, in order to impact the vote weights of each of the answers from each of the pipelines.

In some embodiments, a weighting formula is used to determine a vote weight of an answer in a set of question answer data that was assigned the highest confidence value by a first answering pipeline by: obtaining a first CACT probability by searching a first CACT for a CACT probability, the CACT probability associated with a greatest confidence value that does not exceed the confidence value of the answer, the confidence value of the answer assigned by the first answering pipeline; obtaining a first ACT probability by searching a first ACT for a ACT probability, the first ACT probability associated with a greatest confidence value that does not exceed the confidence value of the answer; calculating a ratio of the first CACT probability divided by the first ACT probability; calculating a product of the ratio multiplied by an AAV; and assigning the product as the vote weight.

Figure 10:
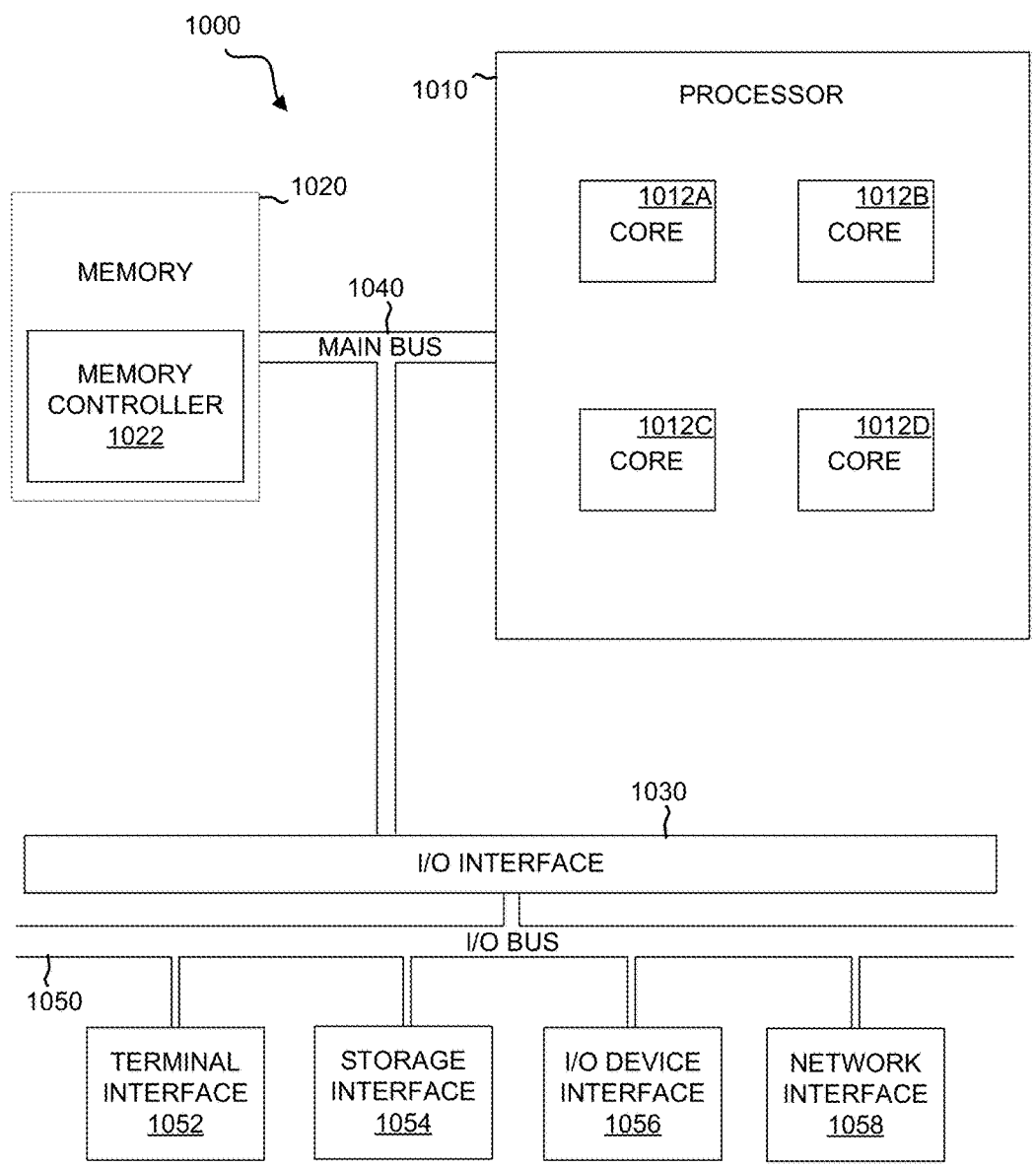
FIG. 10 depicts an example computer system, according to embodiments of the present disclosure.

FIG. 10 depicts the representative major components of an example computer system 1000 that may be used, in accordance with embodiments of the present disclosure. It is appreciated that individual components may vary in complexity, number, type, and\or configuration. The particular examples disclosed are for example purposes only and are not necessarily the only such variations. The computer system 1000 may comprise a processor 1010, memory 1020, an input/output interface (herein I/O or I/O interface) 1030, and a main bus 1040. The main bus 1040 may provide communication pathways for the other components of the computer system 1000. In some embodiments, the main bus 1040 may connect to other components such as a specialized digital signal processor (not depicted).

The processor 1010 of the computer system 1000 may be comprised of one or more cores 1012A, 1012B, 1012C, 1012D (collectively 1012). The processor 1010 may additionally include one or more memory buffers or caches (not depicted) that provide temporary storage of instructions and data for the cores 1012. The cores 1012 may perform instructions on input provided from the caches or from the memory 1020 and output the result to caches or the memory. The cores 1012 may be comprised of one or more circuits configured to perform one or methods consistent with embodiments of the present disclosure. In some embodiments, the computer system 1000 may contain multiple processors 1010. In some embodiments, the computer system 1000 may be a single processor 1010 with a singular core 1012.

The memory 1020 of the computer system 1001 may include a memory controller 1022. In some embodiments, the memory 1020 may comprise a random-access semiconductor memory, storage device, or storage medium (either volatile or non-volatile) for storing data and programs. In embodiments, the blending profiles may be recalled from memory for use by the system in pipeline blending. In some embodiments, the memory may be in the form of modules (e.g., dual in-line memory modules). The memory controller 1022 may communicate with the processor 1010, facilitating storage and retrieval of information in the memory 1020. The memory controller 1022 may communicate with the I/O interface 1030, facilitating storage and retrieval of input or output in the memory 1020.

The I/O interface 1030 may comprise an I/O bus 1050, a terminal interface 1052, a storage interface 1054, an I/O device interface 1056, and a network interface 1058. The I/O interface 1030 may connect the main bus 1040 to the I/O bus 1050. The I/O interface 1030 may direct instructions and data from the processor 1010 and memory 1020 to the various interfaces of the I/O bus 1050. The I/O interface 1030 may also direct instructions and data from the various interfaces of the I/O bus 1050 to the processor 1010 and memory 1020. The various interfaces may include the terminal interface 1052, the storage interface 1054, the I/O device interface 1056, and the network interface 1058. In some embodiments, the various interfaces may include a subset of the aforementioned interfaces (e.g., an embedded computer system in an industrial application may not include the terminal interface 1052 and the storage interface 1054).

Logic modules throughout the computer system 1000—including but not limited to the memory 1020, the processor 1010, and the I/O interface 1030—may communicate failures and changes to one or more components to a hypervisor or operating system (not depicted). The hypervisor or the operating system may allocate the various resources available in the computer system 1000 and track the location of data in memory 1020 and of processes assigned to various cores 1012. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
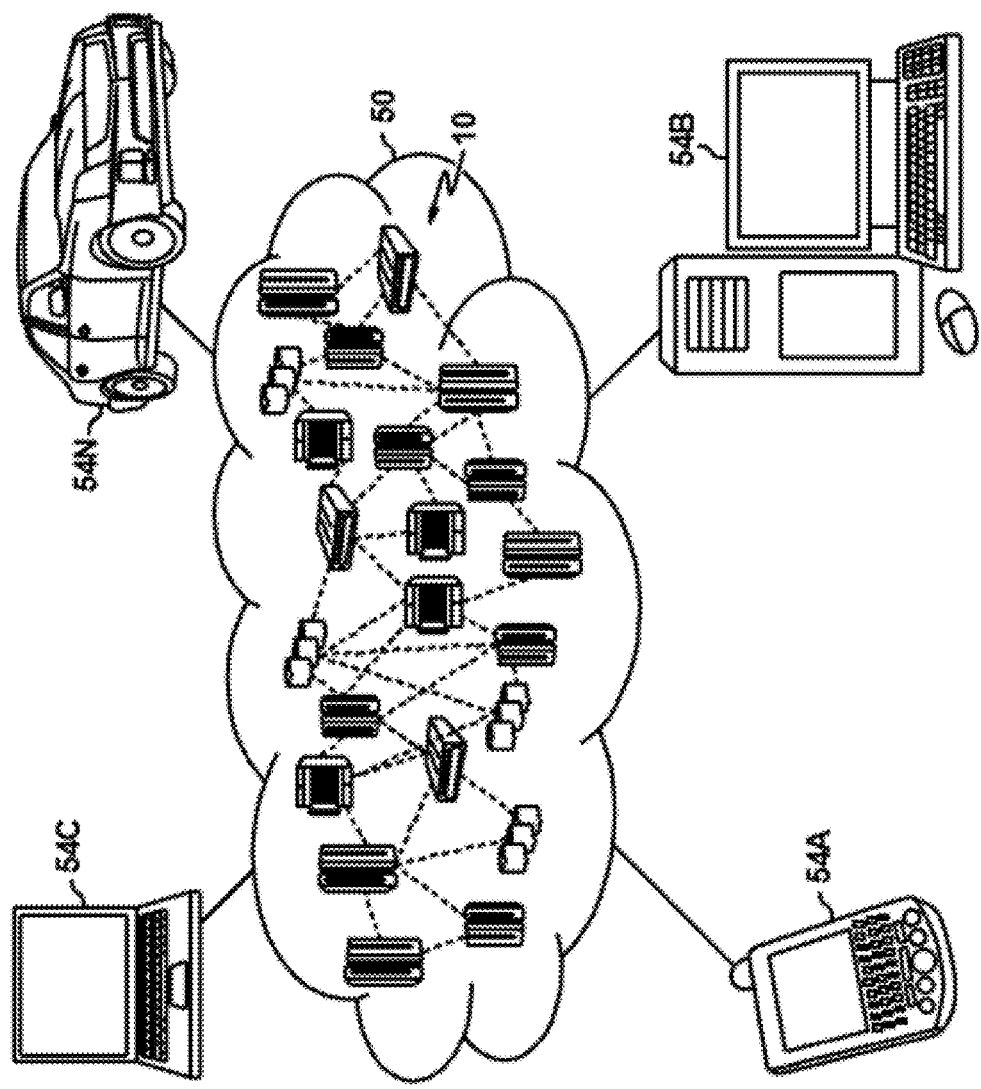
FIG. 8 depicts a cloud computing environment, according to embodiments of the present disclosure.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
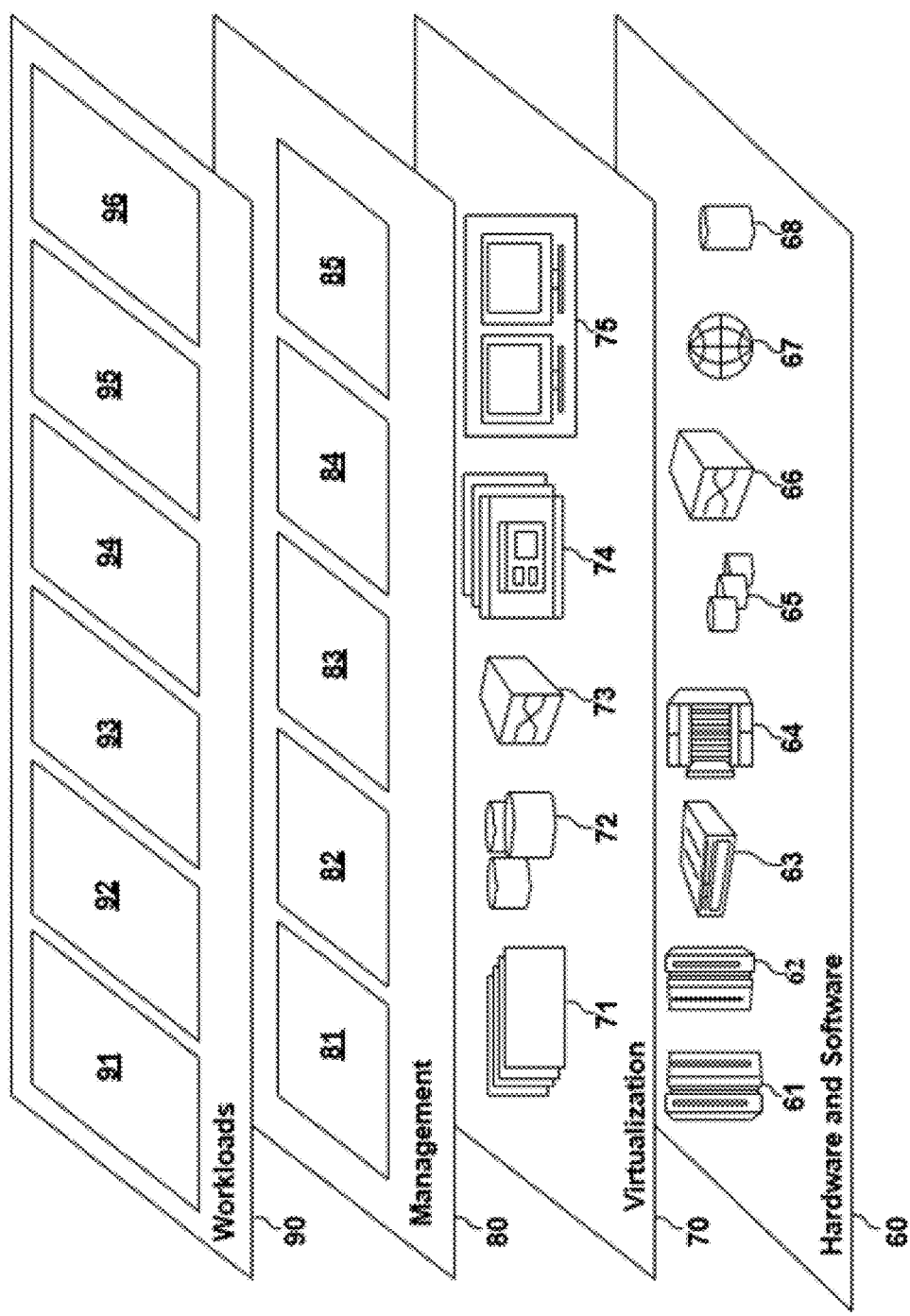
FIG. 9 depicts abstraction model layers, according to embodiments of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and QA system blending 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
generating, for a question, a first set of question answer data using a first answering pipeline, wherein the first set of question answer data comprises a first set of answers and a set of first pipeline confidence values for each answer in the first set of answers;
generating, for the question, a second set of question answer data using a second answering pipeline, wherein the second set of question answer data comprises a second set of answers and a set of second pipeline confidence values for each answer in the second set of answers;
determining, using a weighting formula and a first blending profile associated with the first answering pipeline, a first vote weight for an answer in the first set of question answer data that was assigned a first pipeline highest confidence value by the first answering pipeline;
determining, using the weighting formula and a second blending profile associated with the second answering pipeline, a second vote weight for an answer in the second set of question answer data that was assigned a second pipeline highest confidence value by the second answering pipeline; and
selecting, as a first answer to the question, the answer with an overall highest vote weight from among the answers in the first set of question answer data and in the second set of question answer data, wherein the first blending profile comprises metadata including:
a first answer accuracy value (AAV), the first AAV reflecting a first probability that the first answering pipeline will produce a first correct answer to the question;
a first answer confidence table (ACT), the first ACT reflecting a first set of confidence threshold value and probability association pairs, each first pair indicating a probability that the first answering pipeline will produce an answer with a confidence value exceeding an associated confidence threshold value; and
a first correct answer confidence table (CACT), the first CACT reflecting a second set of confidence threshold value and probability association pairs, each second pair indicating a correct answer probability that the first answering pipeline will produce a correct answer with a second confidence value equal to or greater than the associated second confidence threshold value; and
wherein the weighting formula is used to determine the first vote weight of the answer in the first set of question answer data that was assigned the highest confidence value by the first answering pipeline by:
obtaining a first CACT probability by searching the first CACT for a CACT probability, the CACT probability associated with a greatest confidence value that does not exceed the confidence value of the answer, the confidence value of the answer assigned by the first answering pipeline;
obtaining a first ACT probability by searching the first ACT for a ACT probability, the first ACT probability associated with a greatest confidence value that does not exceed the confidence value of the answer;
calculating a first ratio of the first CACT probability divided by the first ACT probability;
calculating a first product of the first ratio multiplied by the first AAV; and
assigning the first product as the first vote weight.

2. The method of claim 1, wherein the second blending profile comprises metadata including:
a second answer accuracy value (AAV), the second AAV reflecting a second probability that the second answering pipeline will produce a second correct answer to the question;
a second answer confidence table (ACT), the second ACT reflecting a first set of confidence threshold value and probability association pairs, each first pair indicating a probability that the second answering pipeline will produce an answer with a confidence value exceeding an associated confidence threshold value; and
a second correct answer confidence table (CACT), the second CACT reflecting a second set of confidence threshold value and probability association pairs, each second pair indicating a correct answer probability that the second answering pipeline will produce a correct answer with a second confidence value equal to or greater than the associated second confidence threshold value.

3. The method of claim 2, wherein the weighting formula is used to determine the second vote weight of the answer in the second set of question answer data that was assigned the highest confidence value by the second answering pipeline by:
obtaining a second CACT probability by searching the second CACT for a CACT probability;
obtaining a second ACT probability by searching the second ACT for a ACT probability;
calculating a second ratio of the second CACT probability divided by the second ACT probability;
calculating a second product of the second ratio multiplied by the second AAV; and
assigning the second product as the second vote weight.

4. The method of claim 3, wherein:
calculating the first product comprises multiplying the first ratio, the first AAV, and a first confidence value obtained by operating a question classifier on the question; and
calculating the second product comprises multiplying the second ratio, the second AAV, and a second confidence value obtained by operating the question classifier on the question.

5. The method of claim 1, further comprising:
determining, using the weighting formula and the first blending profile associated with the first answering pipeline, a vote weight for each of a first plurality of answers in the first set of question answer data, wherein the first plurality of answers were assigned the highest confidence values by the first answering pipeline;
determining, using the weighting formula and the second blending profile associated with the second answering pipeline, a vote weight for each of a second plurality of answers in the second set of question answer data, wherein the second plurality were assigned the highest confidence values by the second answering pipeline; and
selecting a set of answers to the question, the set of answers to the question having the highest vote weights from among the first plurality of answers and the second plurality of answers.

6. The method of claim 1, wherein:
the generating, for the question, the first set of question answer data using the first answering pipeline further comprises combining a first question classifier confidence value with each of the first pipeline confidence values with each answer in the first set of answers; and generating, for the question, the second set of question answer data using the second answering pipeline further comprises combining a second question classifier confidence value with each of the second pipeline confidence values with each answer in the second set of answers.

7. A system comprising:
a computer readable storage medium with program instructions stored thereon; and
one or more processors configured to execute the program instructions to perform a method comprising:
generating, for a question, a first set of question answer data using a first answering pipeline, wherein the first set of question answer data comprises a first set of answers and a set of first pipeline confidence values for each answer in the first set of answers;
generating, for the question, a second set of question answer data using a second answering pipeline, wherein the second set of question answer data comprises a second set of answers and a set of second pipeline confidence values for each answer in the second set of answers;
determining, using a weighting formula and a first blending profile associated with the first answering pipeline, a first vote weight for an answer in the first set of question answer data that was assigned a first pipeline highest confidence value by the first answering pipeline;
determining, using the weighting formula and a second blending profile associated with the second answering pipeline, a second vote weight for an answer in the second set of question answer data that was assigned a second pipeline highest confidence value by the second answering pipeline; and
selecting, as a first answer to the question, the answer with an overall highest vote weight from among the answers in the first set of question answer data and in the second set of question answer data, wherein the first blending profile comprises metadata including:
a first answer accuracy value (AAV), the first AAV reflecting a first probability that the first answering pipeline will produce a first correct answer to the question;
a first answer confidence table (ACT), the first ACT reflecting a first set of confidence threshold value and probability association pairs, each first pair indicating a probability that the first answering pipeline will produce an answer with a confidence value exceeding an associated confidence threshold value; and
a first correct answer confidence table (CACT), the first CACT reflecting a second set of confidence threshold value and probability association pairs, each second pair indicating a correct answer probability that the first answering pipeline will produce a correct answer with a second confidence value equal to or greater than the associated second confidence threshold value; and
wherein the weighting formula is used to determine the first vote weight of the answer in the first set of question answer data that was assigned the highest confidence value by the first answering pipeline by:
obtaining a first CACT probability by searching the first CACT for a CACT probability, the CACT probability associated with a greatest confidence value that does not exceed the confidence value of the answer, the confidence value of the answer assigned by the first answering pipeline;
obtaining a first ACT probability by searching the first ACT for a ACT probability, the first ACT probability associated with a greatest confidence value that does not exceed the confidence value of the answer;
calculating a first ratio of the first CACT probability divided by the first ACT probability;
calculating a first product of the first ratio multiplied by the first AAV; and
assigning the first product as the first vote weight.

8. The system of claim 7, wherein the second blending profile comprises metadata including:
a second answer accuracy value (AAV), the second AAV reflecting a second probability that the second answering pipeline will produce a second correct answer to the question;
a second answer confidence table (ACT), the second ACT reflecting a first set of confidence threshold value and probability association pairs, each first pair indicating a probability that the second answering pipeline will produce an answer with a confidence value exceeding an associated confidence threshold value; and
a second correct answer confidence table (CACT), the second CACT reflecting a second set of confidence threshold value and probability association pairs, each second pair indicating a correct answer probability that the second answering pipeline will produce a correct answer with a second confidence value equal to or greater than the associated second confidence threshold value.

9. The system of claim 8, wherein the weighting formula is used to determine the second vote weight of the answer in the second set of question answer data that was assigned the highest confidence value by the second answering pipeline by:
obtaining a second CACT probability by searching the second CACT for a CACT probability;
obtaining a second ACT probability by searching the second ACT for a ACT probability;
calculating a second ratio of the second CACT probability divided by the second ACT probability;
calculating a second product of the second ratio multiplied by the second AAV; and
assigning the second product as the second vote weight.

10. The system of claim 9, wherein:
calculating the first product comprises multiplying the first ratio, the first AAV, and a first confidence value obtained by operating a question classifier on the question; and
calculating the second product comprises multiplying the second ratio, the second AAV, and a second confidence value obtained by operating the question classifier on the question.

11. The system of claim 7, wherein the method further comprises:
determining, using the weighting formula and the first blending profile associated with the first answering pipeline, a vote weight for each of a first plurality of answers in the first set of question answer data, wherein the first plurality of answers were assigned the highest confidence values by the first answering pipeline;
determining, using the weighting formula and the second blending profile associated with the second answering pipeline, a vote weight for each of a second plurality of answers in the second set of question answer data, wherein the second plurality were assigned the highest confidence values by the second answering pipeline; and selecting a set of answers to the question, the set of answers to the question having the highest vote weights from among the first plurality of answers and the second plurality of answers.

12. A computer program product comprising a computer readable storage medium having program instructions embodied therewith, wherein the computer readable storage medium is not a transitory signal per se, the program instructions executable by a computer processing circuit to cause the circuit to perform the method comprising:
  generating, for a question, a first set of question answer data using a first answering pipeline, wherein the first set of question answer data comprises a first set of answers and a set of first pipeline confidence values for each answer in the first set of answers;
  generating, for the question, a second set of question answer data using a second answering pipeline, wherein the second set of question answer data comprises a second set of answers and a set of second pipeline confidence values for each answer in the second set of answers;
  determining, using a weighting formula and a first blending profile associated with the first answering pipeline, a first vote weight for an answer in the first set of question answer data that was assigned a first pipeline highest confidence value by the first answering pipeline;
  determining, using the weighting formula and a second blending profile associated with the second answering pipeline, a second vote weight for an answer in the second set of question answer data that was assigned a second pipeline highest confidence value by the second answering pipeline; and
  selecting, as a first answer to the question, the answer with an overall highest vote weight from among the answers in the first set of question answer data and in the second set of question answer data, wherein the first blending profile comprises metadata including:
    a first answer accuracy value (AAV), the first AAV reflecting a first probability that the first answering pipeline will produce a first correct answer to the question;
    a first answer confidence table (ACT), the first ACT reflecting a first set of confidence threshold value and probability association pairs, each first pair indicating a probability that the first answering pipeline will produce an answer with a confidence value exceeding an associated confidence threshold value; and
    a first correct answer confidence table (CACT), the first CACT reflecting a second set of confidence threshold value and probability association pairs, each second pair indicating a correct answer probability that the first answering pipeline will produce a correct answer with a second confidence value equal to or greater than the associated second confidence threshold value; and
  wherein the weighting formula is used to determine the first vote weight of the answer in the first set of question answer data that was assigned the highest confidence value by the first answering pipeline by:
    obtaining a first CACT probability by searching the first CACT for a CACT probability, the CACT probability associated with a greatest confidence value that does not exceed the confidence value of the answer, the confidence value of the answer assigned by the first answering pipeline;
    obtaining a first ACT probability by searching the first ACT for a ACT probability, the first ACT probability associated with a greatest confidence value that does not exceed the confidence value of the answer;
    calculating a first ratio of the first CACT probability divided by the first ACT probability;
    calculating a first product of the first ratio multiplied by the first AAV; and
    assigning the first product as the first vote weight.

13. The computer program product of claim 12, wherein the second blending profile comprises metadata including:
  a second answer accuracy value (AAV), the second AAV reflecting a second probability that the second answering pipeline will produce a second correct answer to the question;
  a second answer confidence table (ACT), the second ACT reflecting a first set of confidence threshold value and probability association pairs, each first pair indicating a probability that the second answering pipeline will produce an answer with a confidence value exceeding an associated confidence threshold value; and
  a second correct answer confidence table (CACT), the second CACT reflecting a second set of confidence threshold value and probability association pairs, each second pair indicating a correct answer probability that the second answering pipeline will produce a correct answer with a second confidence value equal to or greater than the associated second confidence threshold value.

14. The computer program product of claim 13, wherein the weighting formula is used to determine the second vote weight of the answer in the second set of question answer data that was assigned the highest confidence value by the second answering pipeline by:
  obtaining a second CACT probability by searching the second CACT for a CACT probability;
  obtaining a second ACT probability by searching the second ACT for a ACT probability;
  calculating a second ratio of the second CACT probability divided by the second ACT probability;
  calculating a second product of the second ratio multiplied by the second AAV; and
  assigning the second product as the second vote weight.

* * * * *